United States Patent [19]

Kubota et al.

[11] Patent Number: 5,638,238

[45] Date of Patent: Jun. 10, 1997

[54] MAGNETIC HEAD DEVICE WITH MAGNETIC TAPE GUIDES

[75] Inventors: Daisaburo Kubota, Osaka; Seijiro Okada, Neyagawa, both of Japan

[73] Assignee: Matsushita Electric Industrial Co., Ltd., Osaka, Japan

[21] Appl. No.: 941,928

[22] Filed: Sep. 8, 1992

[30] Foreign Application Priority Data

Sep. 11, 1991 [JP] Japan .................................. 3-231558
Sep. 25, 1991 [JP] Japan .................................. 3-245584

[51] Int. Cl.⁶ .................................................. G11B 15/60
[52] U.S. Cl. .................................................. 360/130.21
[58] Field of Search ........................ 360/130.21, 130.22, 360/130.2

[56] References Cited

U.S. PATENT DOCUMENTS

| | | | |
|---|---|---|---|
| 4,387,410 | 6/1983 | Takanohashi et al. | 360/130.21 |
| 4,485,420 | 11/1984 | Schoenmakers | 360/130.21 |
| 4,688,326 | 8/1987 | Linke | 360/129 |
| 4,732,213 | 3/1988 | Bennett et al. | 166/292 |
| 4,894,737 | 1/1990 | Hamana et al. | 360/130.21 |
| 4,962,438 | 10/1990 | Kunze | 360/130.21 |
| 5,055,956 | 10/1991 | Kaya et al. | 360/109 |
| 5,134,536 | 7/1992 | Komatsu et al. | 360/130.21 |
| 5,202,808 | 4/1993 | Saito | 360/130.21 |

FOREIGN PATENT DOCUMENTS

| | | |
|---|---|---|
| 0323188 | 7/1989 | European Pat. Off. . |
| 0337566 | 10/1989 | European Pat. Off. . |
| 0350054 | 1/1990 | European Pat. Off. . |
| 3122805 | 5/1991 | Japan . |

OTHER PUBLICATIONS

Patent Abstracts of Japan, vol. 9, No. 170 (P-373) (1893) 16 Jul. 1985 & JP-A-60 045 967 (Matsushita) 12 Mar. 1985.

*Primary Examiner*—Stuart S. Levy
*Assistant Examiner*—George J. Letscher

[57] ABSTRACT

A magnetic head assembly includes, a magnetic head for magnetic tape recording, a tape guide for guiding a magnetic tape, and a metal frame on which the tape guide is mounted. The magnetic head is fixed directly to the metal frame so that a material for forming the tape guide is not arranged between the magnetic head and the metal frame. The tape guide includes a tape edge positioning portion contacting with an edge of the magnetic tape so that the magnetic tape is positioned in a direction substantially perpendicular to a tape feed direction and substantially parallel to a recording surface of the magnetic tape, a recording surface guide portion for guiding the recording surface of the magnetic tape in a direction substantially perpendicular to the recording surface of the magnetic tape, and a tape urging portion which urges the magnetic tape toward the tape edge positioning portion so that the magnetic tape is positioned along the tape edge positioning portion. Further an angle between the recording surface guide portion and an imaginary plane tangent to the tape urging portion at a place on which another edge of the magnetic tape contacts with the tape urging portion is increased continuously in a direction extending from the edge of the magnetic tape positioned by the tape edge positioning portion toward the another edge of the magnetic tape urged by the tape urging portion.

2 Claims, 5 Drawing Sheets

FIG. I
PRIOR ART
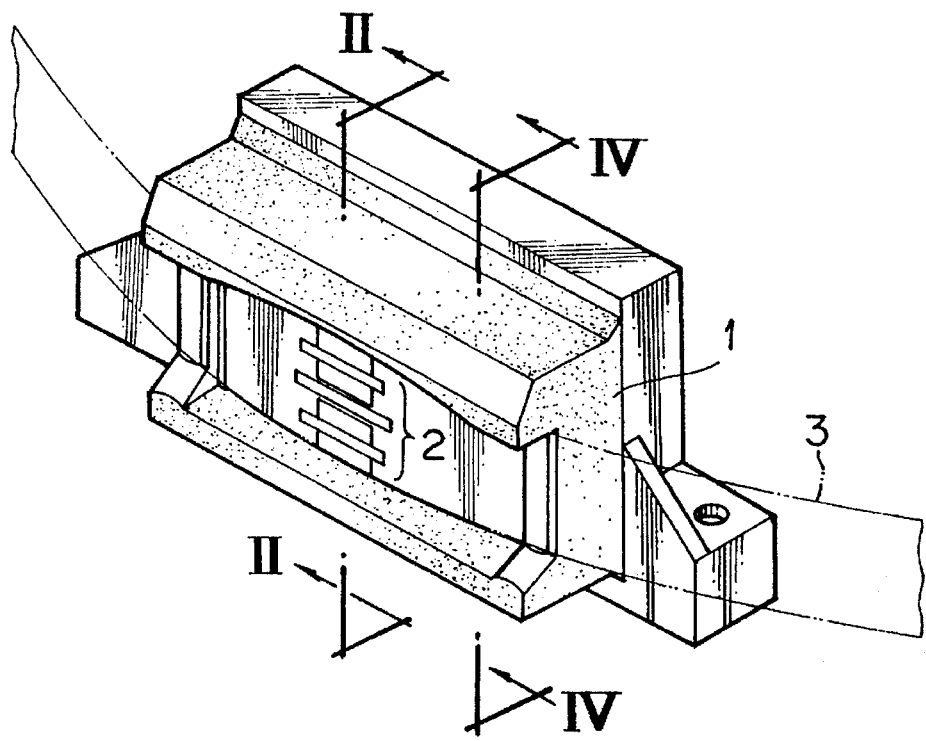
FIG. 2
PRIOR ART
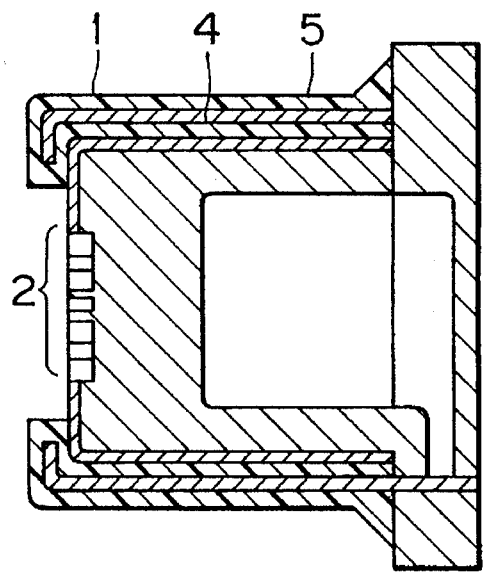

MAGNETIC HEAD DEVICE WITH MAGNETIC TAPE GUIDES

BACKGROUND OF THE INVENTION AND RELATED ART STATEMENT

The present invention relates to a magnetic head assembly for a magnetic tape recorder or the like.

In a conventional magnetic head assembly disclosed in Publication of Japanese Laid-open Patent Application Hei-3-122805, as shown in FIG. 1, 2 and 3, a magnetic head 2 is fixed to a tape guide 1, and a tape 3 is fed on a forward surface of the magnetic head 2. A core 4 with a magnetic permeability for preventing magnetic noise from affecting the magnetic head 2 is surrounded by a plastic resin 5 to form the tape guide 1.

And further, as shown in FIGS. 4a, 4b and 5, in a conventional magnetic head assembly, a first tape edge contact portion 6 extends substantially perpendicularly to a recording surface contact portion 8, and a connecting portion 9 composed of a curved portion and a straight portion extends between the recording surface contact portion 8 and a second tape edge contact portion 7 extending substantially perpendicularly to the recording surface contact portion 8. An angle θ between the second tape edge contact portion 7 and the straight portion is 50-60 degree.

OBJECT AND SUMMARY OF THE INVENTION

An object of the present invention is to provide a magnetic head assembly in which a positional relation between a magnetic head and a magnetic tape is kept correctly.

According to the present invention, a magnetic head assembly comprises, a magnetic head for magnetic tape recording, a tape guide for guiding a magnetic tape, and a metal frame, on which the tape guide is mounted, and to which the magnetic head is fixed directly so that a material for forming the tape guide is not arranged between the magnetic head and the metal frame.

Also, according to the present invention, a magnetic head assembly comprises, a magnetic head for magnetic tape recording, and a tape guide for guiding a magnetic tape, the tape guide including a tape edge positioning portion contacting with an edge of the magnetic tape so that the magnetic tape is positioned in a direction substantially perpendicular to a tape feed direction and substantially parallel to a recording surface of the magnetic tape, a recording surface guide portion for guiding the recording surface of the magnetic tape in a direction substantially perpendicular to the recording surface of the magnetic tape, and a tape urging portion which urges the magnetic tape toward the tape edge positioning portion so that the magnetic tape is positioned along the tape edge positioning portion, wherein an angle between the recording surface guide portion and an imaginary plane tangent to the tape urging portion at a place on which another edge of the magnetic tape contacts with the tape urging portion is increased continuously in a direction extending from the edge of the magnetic tape positioned by the tape edge positioning portion toward the another edge of the magnetic tape urged by the tape urging portion.

Since the magnetic head is fixed directly to the metal frame so that the material for forming the tape guide is not arranged between the magnetic head and the metal frame, a positional relation between the metal frame and the magnetic head is not affected by undesirable shape error, elasticity, plasticity and age deterioration of the material the forming tape guide. Therefore, a positional relation between the magnetic head and the magnetic tape is kept correctly.

Also, since the angle between the recording surface guide portion and the imaginary plane tangent to the tape urging portion at a point on a range in which the another edge of the magnetic tape may contact with the tape urging portion is increased continuously in the range according to a proceeding of the tape in the direction extending from the edge of the magnetic tape positioned by the tape edge positioning portion toward the another edge of the magnetic tape urged by the tape urging portion, a force for urging the magnetic tape toward the tape edge positioning portion is increased according to the proceeding of the tape in the direction extending from the edge of the magnetic tape positioned by the tape edge positioning portion toward the another edge of the magnetic tape urged by the tape urging portion so that the magnetic tape is correctly positioned by the tape guide, and the magnetic tape is prevented from being bent sharply by the tape urging portion. Therefore, the positional relation between the magnetic head and the magnetic tape is kept correctly.

BRIEF DESCRIPTION OF THE DRAWINGS

FIG. 1 is an oblique projection view showing a magnetic head assembly of the prior art.

FIG. 2 is a cross-sectional view taken along a line II—II in FIG. 1.

DETAILED DESCRIPTION OF THE PREFERRED EMBODIMENTS

Figure 3:
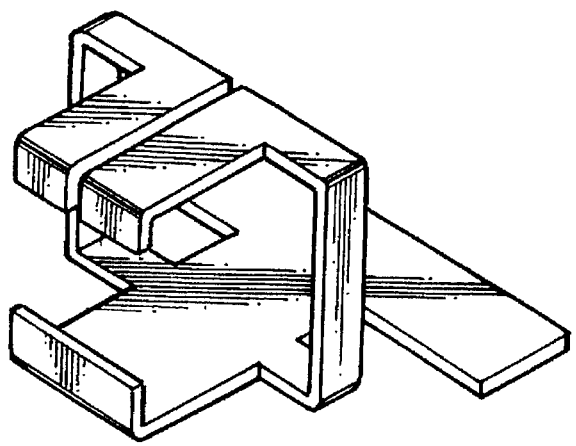
FIG. 3 is an oblique projection view showing a magnetic material surrounded by a resin in the magnetic head assembly of FIG. 1.
Figure 4A:
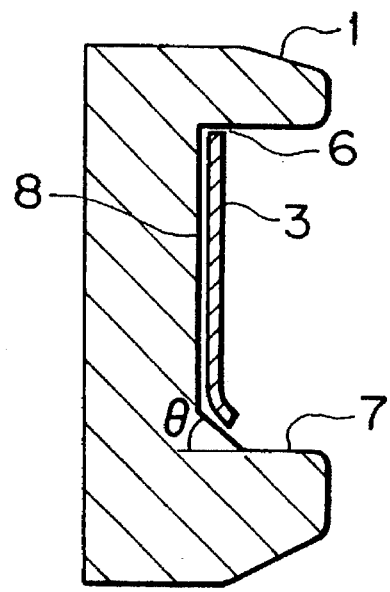
FIGS. 4a and 4b are cross-sectional views taken along a line IV—IV in FIG. 1, showing conditions of a tape guided on the magnetic head assembly of FIG. 1.
Figure 4B:
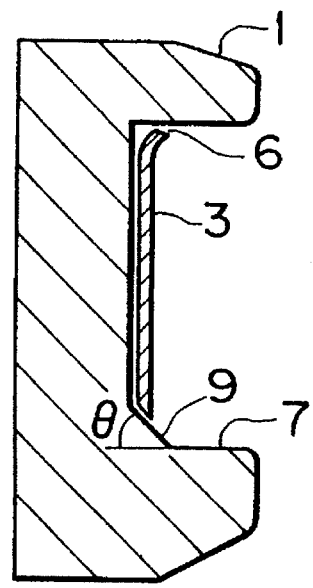
Figure 5:
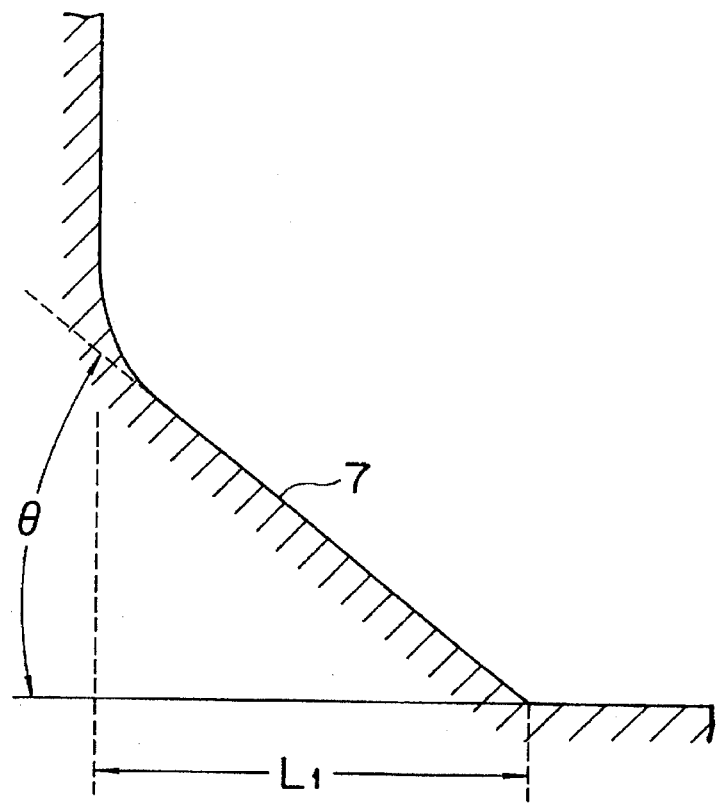
FIG. 5 is an enlarged cross-sectional view showing an important portion in FIGS. 4a and 4b.
Figure 6:
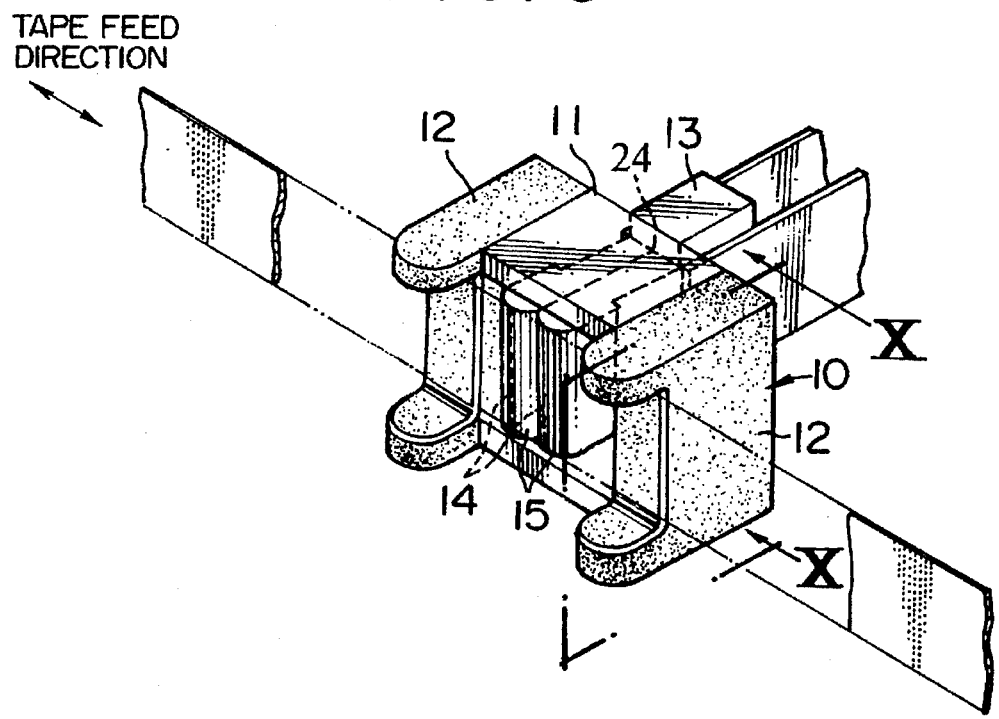
FIG. 6 is an oblique projection schematic view showing a magnetic head assembly according to the present invention.
Figure 7:
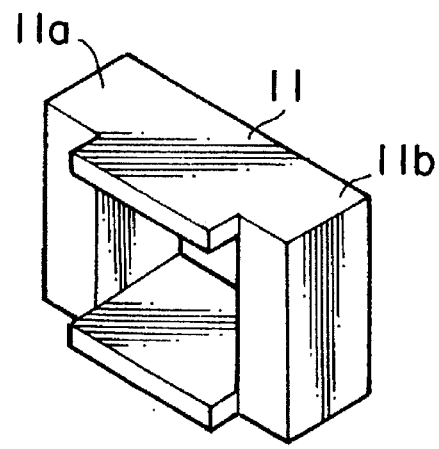
FIG. 7 is an oblique projection view showing a metal frame included by the magnetic head assembly of FIG. 6.
Figure 8:
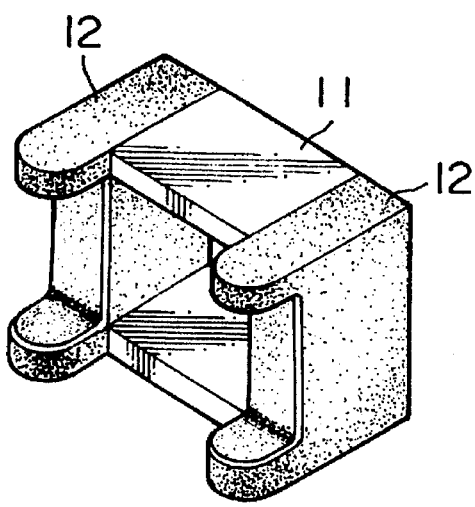
FIG. 8 is an oblique projection view showing an assembly of the metal frame shown in FIG. 7 and a tape guide included by the magnetic head assembly of FIG. 6.
Figure 9:
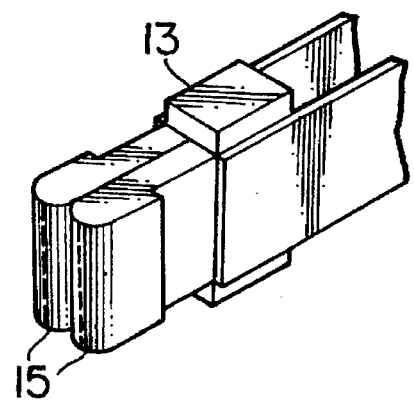
FIG. 9 is an oblique projection view showing a magnetic head included by the magnetic head assembly of FIG. 6.

As shown in FIG. 6, a magnetic head assembly 10 includes a metal frame 11 (shown in FIG. 7) made of a magnetically permeable or magnetic material, for example, Permalloy or the like, a tape guide 12 which is made of a plastic resin for preventing a damage of a tape 3. Tape guide 12 surrounds and adheres to both ends 11a and 11b of the metal frame 11 (as shown in FIG. 8) to form a tape edge positioning portion 17, a recording surface guide portion 16, a tape urging portion 19 and a tape edge limit portion 18 (as shown in FIG. 10), and a magnetic head 15 (shown in FIG. 9) arranged on a part of the metal frame 11 which is not covered by a material of the tape guide 12.

The magnetic head 15 has a pair of magnetic core ends 14 to form a gap therebetween so that a magnetic flux generated between the magnetic core ends 14 passes through the tape 3 to magnetize or demagnetize a portion of the tape 3 over the gap. Further, the magnetic head 15 has a core holder 13 which is made of a magnetically non-permeable or non-magnetic material, for example, a non-magnetic stainless steel or a ceramic and through which the magnetic head 15 is fixed to the metal frame 11 by a spot-welding process at a position 24 or by an adhesive between the metal frame 11 and the core holder 13. Therefore, at least a part of the magnetic head 15 is directly connected to the metal frame 11 without the material of the tape guide 12 between the metal frame 11 and the part of the magnetic head 15, so that the magnetic head 15 is fixedly and correctly mounted on the metal frame 11. Another part of the magnetic head 15 may be adhered or connected to the metal frame 11 and/or the tape guide 12 by a plastic resin (not shown).

Figure 10:
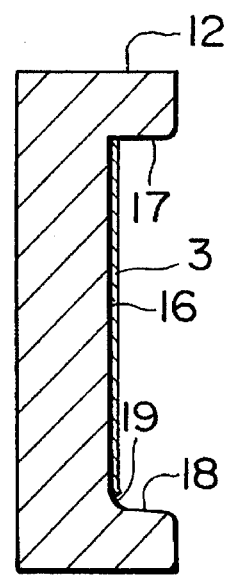
FIG. 10 is a cross-sectional view taken along a line X—X in FIG. 6 and showing an arrangement of a tape edge positioning portion, a recording surface guide portion and a tape urging portion included by the tape guide of FIG. 6.

On the tape guide 12, as shown in FIG. 10, the tape edge positioning portion 17 extends substantially perpendicularly to the recording surface guide portion 16 and contacts with an edge of the tape 3 so that the tape 3 is positioned along the tape edge positioning portion 17 in a direction substantially perpendicular to a tape feed direction and substantially parallel to a recording surface of the tape 3. The recording surface guide portion 16 contacts with the recording surface of the tape 3 so that the recording surface is positioned in a direction substantially perpendicular to the type feed direction.

Figure 11:
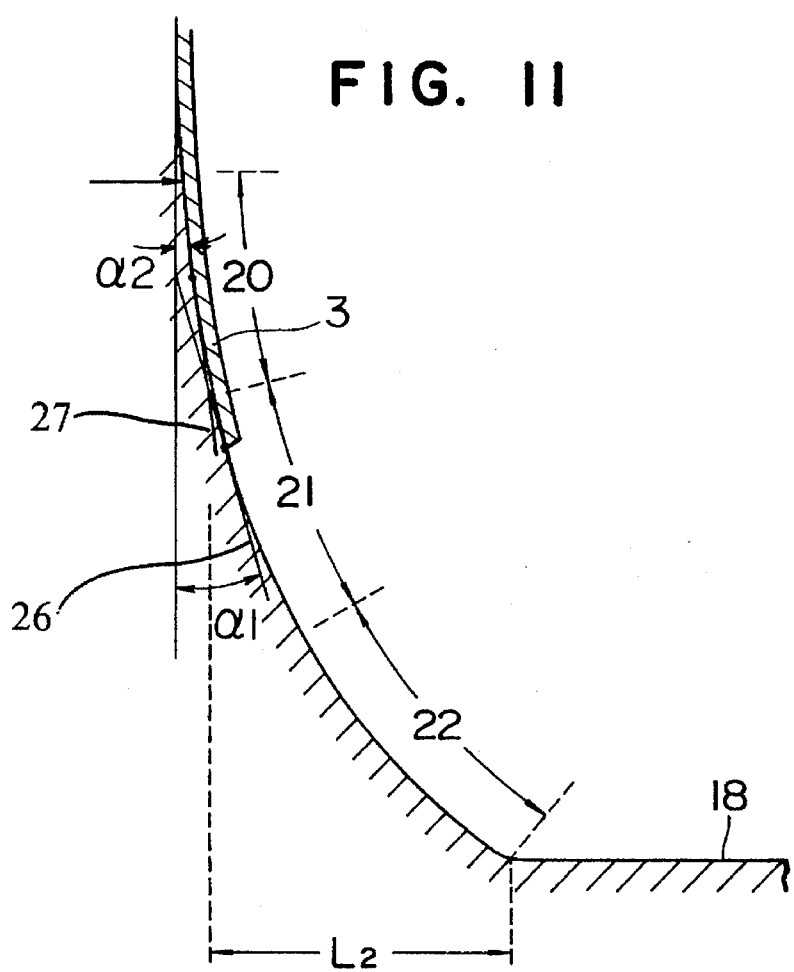
FIG. 11 is an enlarged cross-sectional view showing an important portion of the tape urging portion in FIG. 10.

The tape urging portion 19 extends from the recording surface guide portion 16 and has a curvature whose radius is constant or may decrease in a direction from the recording surface guide portion 16 toward the tape edge limit portion 18, that is, as shown in FIG. 11, a radius of a curvature 20 is 0.3 mm, a radius of a curvature 21 is 0.25 mm, and a radius of a curvature 22 is 0.2 mm. An angle $\alpha 1$ between the recording surface guide portion 16 and an imaginary plane 26 tangent to the tape urging portion 19 at a point on which another edge of the magnetic tape 3 contacts with the tape urging portion 19 is increased continuously in a direction extending from the edge of the magnetic tape 3 positioned by the tape edge positioning portion 17 toward the another edge of the magnetic tape 3 urged by the tape urging portion 19, and is smaller than an angle between the recording surface guide portion 16 and the tape edge positioning portion 17. That is, the angle $\alpha 1$ between the recording surface guide portion 16 and the imaginary plane 26 tangent to the tape urging portion 19 at a point on a range in which the another edge of the magnetic tape 3 may contact with the tape urging portion 19 is increased continuously in the range according to a proceeding of the magnetic tape 3 on the tape urging portion 19 in the direction extending from the edge of the magnetic tape 3 positioned by the tape edge positioning portion 17 toward the another edge of the magnetic tape 3 urged by the tape urging portion 19. An angle $\alpha 2$ between the recording surface guide portion 16 and an imaginary plane 27 tangent to the tape urging portion 19 may increase continuously over a whole range in which the magnetic tape 3 contacts with or covers the tape urging portion 19, or alternatively may increase only in the range of the tape urging portion 19 in which the another edge of the magnetic tape 3 contacts with or moves on the tape urging portion 19. That is, the tape urging portion 19 may include a straight portion between the recording surface guide portion 16 and the above described curvature portion thereof. As a matter of course, the tape urging portion 19 may include only the above described curvature portion.

In the present invention, when a force for urging the magnetic tape 3 toward the tape edge positioning portion 17 by the tape urging portion 19, as above described is equal to a force for urging the magnetic tape 3 toward the first tape edge contact portion 6 of the prior art, a maximum displacement $L_2$ of the magnetic tape 3 on the tape urging portion 19 is smaller than a maximum displacement $L_1$ of the magnetic tape 3 on the connecting portion 9 of the prior art so that an undesirable curvature of the magnetic tape 3 is not formed and a movement stability of the magnetic tape 3 is kept while the magnetic tape 3 is fed on the magnetic head assembly 10. Also, an undesirable separation of the magnetic tape 3 from the magnetic head 15 for causing a spacing loss is prevented. The magnetic tape.3 may be either an analog recording tape or a digital recording type.

What is claimed is:

1. A magnetic head assembly for use with a magnetic tape having a first edge an a second edge and a recording surface portion between said first edge and said second edge, said magnetic head assembly comprising:

(a) a magnetic head for magnetic tape recording; and
   (b) a tape guide, for guiding a magnetic tape, comprising
      (i) a tape edge positioning portion, for contacting with said first edge of the magnetic tape so as to position the magnetic tape in a direction substantially perpendicular to a tape feed direction and substantially parallel to the recording surface portion of the magnetic tape,
      (ii) a recording surface guide portion for guiding the recording surface portion of the magnetic tape, and
      (iii) a tape urging portion for urging a second edge of the magnetic tape toward the tape edge positioning portion so as to position the magnetic tape along the tape edge positioning portion, said tape urging portion having a radius of curvature decreasing substantially continuously in a direction extending from the first edge of the magnetic tape positioned by the tape edge positioning portion toward the second edge of the magnetic tape urged by the tape urging portion,
   wherein an angle between the recording surface guide portion and an imaginary plane, tangent to the tape urging portion at a position where the second edge of the magnetic tape contacts the tape urging portion, increases continuously in said direction extending from the first edge of the magnetic tape positioned by the tape edge positioning portion toward the second edge of the magnetic tape urged by the tape urging portion.

2. A magnetic head assembly according to claim 1, wherein the tape urging portion is continuously curved.

* * * * *